United States Patent
Arneja et al.

(10) Patent No.: US 10,992,562 B2
(45) Date of Patent: Apr. 27, 2021

(54) SYSTEM FOR NETWORK EVENT DETECTION AND ANALYSIS

(71) Applicant: Arista Networks, Inc., Santa Clara, CA (US)

(72) Inventors: Gagandeep S. Arneja, Santa Clara, CA (US); Justin Costa-Roberts, San Francisco, CA (US); Charanjith Kunduru, Santa Clara, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 15/859,012

(22) Filed: Dec. 29, 2017

(65) Prior Publication Data
US 2019/0207839 A1  Jul. 4, 2019

(51) Int. Cl.
*H04L 12/26* (2006.01)
*H04L 12/24* (2006.01)

(52) U.S. Cl.
CPC .......... *H04L 43/10* (2013.01); *H04L 41/0645* (2013.01); *H04L 41/14* (2013.01); *H04L 43/065* (2013.01); *H04L 43/0823* (2013.01)

(58) Field of Classification Search
None
See application file for complete search history.

(56) References Cited

U.S. PATENT DOCUMENTS

| | | | |
|---|---|---|---|
| 9,729,414 B1 | 8/2017 | Oliveira et al. | |
| 2005/0276386 A1* | 12/2005 | Ethier | H04L 43/00 379/32.05 |
| 2006/0218447 A1* | 9/2006 | Garcia | H04L 43/087 714/39 |
| 2007/0250625 A1* | 10/2007 | Titus | H04L 69/28 709/224 |
| 2009/0052330 A1 | 2/2009 | Matsunaga et al. | |
| 2009/0161567 A1* | 6/2009 | Jayawardena | H04L 63/1441 370/252 |
| 2010/0008233 A1* | 1/2010 | Ee | H04L 45/72 370/241 |
| 2011/0280567 A1* | 11/2011 | Lyon | H04B 10/0791 398/10 |

(Continued)

OTHER PUBLICATIONS

Related PCT Application PCT/US2018/068018, International Search Report and Written Opinion dated Apr. 19, 2019, 10 pages.

*Primary Examiner* — Mariela Vidal Carpio
(74) *Attorney, Agent, or Firm* — Fountainhead Law Group P.C.

(57) ABSTRACT

A method includes receiving a single request to configure a continuous route tracer (CRT) between a first plurality of network devices and a second plurality of network devices and configuring, by a processing device of a control server, the CRT between the first plurality of network devices and the second plurality of network devices. The method further includes receiving a plurality of probe reports corresponding to a plurality of CRT probes sent between the first plurality of network devices and the second plurality of network devices and analyzing the reports to detect one or more anomalies corresponding to a network comprising the first plurality of network devices and the second plurality of network devices. The method further includes providing the one or more anomalies for display.

15 Claims, 6 Drawing Sheets

(56) References Cited

U.S. PATENT DOCUMENTS

| | | | |
|---|---|---|---|
| 2013/0057696 A1* | 3/2013 | Felt | H04N 7/186 |
| | | | 348/158 |
| 2013/0182712 A1* | 7/2013 | Aguayo | H04L 12/4633 |
| | | | 370/395.53 |
| 2014/0348022 A1* | 11/2014 | Jain | H04L 12/185 |
| | | | 370/254 |
| 2015/0032752 A1 | 1/2015 | Greifeneder et al. | |
| 2015/0106929 A1 | 4/2015 | Mahaffey | |
| 2016/0285750 A1* | 9/2016 | Saquib | H04L 43/10 |
| 2017/0111209 A1* | 4/2017 | Ward | H04L 41/0631 |
| 2018/0077043 A1* | 3/2018 | Kubik | H04L 43/10 |
| 2019/0327124 A1* | 10/2019 | Lai | H04L 27/362 |

* cited by examiner

SYSTEM FOR NETWORK EVENT DETECTION AND ANALYSIS

BACKGROUND

Network administrators may be tasked with ensuring that network infrastructure is operating properly. As network infrastructures become more complex, this task has become increasingly difficult. In particular, attempting to troubleshoot complex network infrastructure using traditional troubleshooting tools (e.g., ping or traceroute) is a difficult and time consuming task. For example, test packets sent by traditional trouble-shooting tools may take specific paths through the network and such tools may not cover all available network paths.

SUMMARY

In some embodiments, a method is provided. The method includes receiving a single request to configure a continuous route tracer (CRT) between a first plurality of network devices and a second plurality of network devices and configuring, by a processing device of a control server, the CRT between the first plurality of network devices and the second plurality of network devices. The method further includes receiving a plurality of probe reports corresponding to a plurality of CRT probes sent between the first plurality of network devices and the second plurality of network devices and analyzing the reports to detect one or more anomalies corresponding to a network comprising the first plurality of network devices and the second plurality of network devices. The method further includes providing the one or more anomalies for display.

In some embodiments, a system is provided. The system includes a control server comprising a processing device. The processing device of the control server is to: receive a single request to configure a continuous route tracer (CRT) between a first plurality of network devices and a second plurality of network devices; configure the CRT between the first plurality of network devices and the second plurality of network devices; receive a plurality of probe reports corresponding to a plurality of CRT probes sent between the first plurality of network devices and the second plurality of network devices; analyze the reports to detect one or more anomalies corresponding to a network comprising the first plurality of network devices and the second plurality of network devices; and provide the one or more anomalies for display.

In some embodiments, a non-transitory computer-readable storage medium is provided. The non-transitory computer readable storage medium having instructions stored thereon that, when executed by a processing device, cause the processing device to: receive a single request to configure a continuous route tracer (CRT) between a first plurality of network devices and a second plurality of network devices; configure the CRT between the first plurality of network devices and the second plurality of network devices; receive a plurality of probe reports corresponding to a plurality of CRT probes sent between the first plurality of network devices and the second plurality of network devices; analyze the reports to detect one or more anomalies corresponding to a network comprising the first plurality of network devices and the second plurality of network devices; and provide the one or more anomalies for display.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Various embodiments of network event detection and analysis are described herein. Data centers, including data networks, can be large and complex. Devices in such data networks may often be intermittently unreachable, which may result in a variety of disruptions (e.g., the unavailability or loss of service) to a distributed application running on servers connected to end network devices. Depending on the size of the network, it can take a substantial amount of time and resources to debug such problems, as the cause may be any of a multitude of events that can occur in the network. Further, problems may occur anywhere in the network.

The embodiments of the present disclosure solve the above problems by providing systems and operations for network event detection and analysis. In one embodiment, the embodiments described herein provide for the monitoring of the connectivity between any two devices in a network. In one embodiment, if a reachability problem should occur, the system identifies the issue and pinpoints the device or device-pair that caused it. In one embodiment, the system performs network event detection and analysis and provides results in real-time. It should be noted that the embodiments described herein apply not only to data centers, but to any enterprise or cloud service provider as well.

Figure 1:
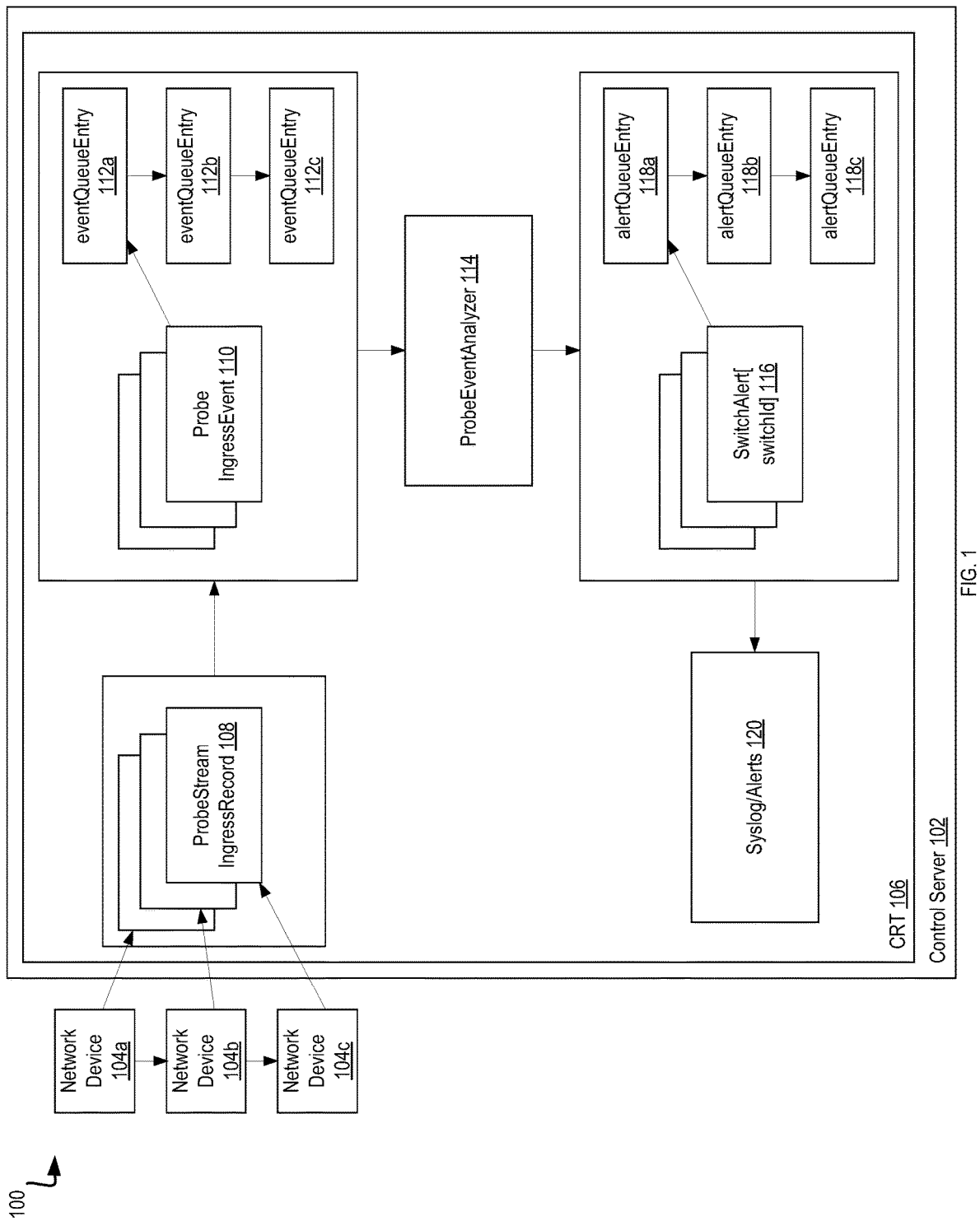
FIG. 1 is a block diagram of a system in which network event detection and analysis may occur in accordance with some embodiments.

FIG. 1 is a block diagram of a system 100 in which network event detection and analysis may occur in accordance with some embodiments. System 100 may include a control server 102 configured to communicate with network devices 104a-c over one or more networks, according to one embodiment. The one or more networks can be a local area network (LAN), a wireless network, a telephone network, a mobile communications network, a wide area network (WAN), such as the Internet, or similar communication system. The one or more networks may be the same network or different networks.

Control server 102 may include various data stores, and/or other data processing equipment. Control server 102 may be implemented by a single machine or a cluster of machines. Control server 102 may include, for example, computer system 500 of FIG. 5. Control server 102 may run as a Virtual Machine (VM) on a generic server. In one embodiment, control server 102 may be one server or may represent multiple servers. System 100 may optionally include one or more storage devices, which can include, for example, mass storage device such as flash memory, magnetic or optical disks, or tape drives, read-only memory (ROM); random-access memory (RAM); erasable programmable memory (e.g., EPROM and EEPROM); flash memory; or any other type of storage medium. Storage devices may be included in various components of system 100 and/or separate from the components of system 100.

System 100 may include network devices (e.g., network devices 104a-c). In one embodiment, network devices 104a-c are network switches. The network devices 104a-c may be any network switch capable of routing or switching data from an incoming port to an outgoing port.

Control server 102 may include continuous route tracer (CRT) 106. In one embodiment, CRT is a configurable control server application that facilitates communication between network devices 104a-c. CRT may include various subcomponents and modules, as described. In one embodiment, CRT 106 may track ingress probe streams recorded at intermediate and the final destination network switches (e.g., network devices 104a-c) and correlate them to corresponding egress streams. In one embodiment, an egress stream corresponds to the probe stream at the originating device and ingress is the probe stream received by the intermediate and final destination network switches. If an egress stream loses a corresponding ingress stream at the destination switch, CRT 106 may analyze the ingress streams recorded at intermediate switches to determine at which intermediate switch the loss started to happen. Thus, a misconfiguration or a link loss may be detected as it may lead to stream(s) experiencing a loss at the problematic switch and downstream switches. If loss is detected at a switch, CRT 106 may provide an indication of the loss to a user via a message or alert. In one embodiment, multiple stream losses at a switch may be collapsed into a single alert about the switch at which the problem is occurring.

In one embodiment, probe stream records (e.g., ProbeStreamRecords 108) received from network devices 104a-c are monitored for losses. Probe stream records, such as ProbeStreamRecords 108, may be records of probes received by receiving network devices, as well as various characteristics associated with the probes. In one embodiment, a probe stream record may include the state of a given probe stream. A probe stream may be a stream of probes received by a receiving network device. In some cases, probes streams may include loss events. A loss event may refer to a probe that was supposed to be received by a given receiving node, but was not. In another embodiment, a loss event may refer to any other network anomaly.

In one embodiment, detected loss events may be added to a probe events record. In a broad sense, a probe events record may include a record of any issues (e.g., events, anomalies, etc.) in the network, as detected by receiving network devices. Individual loss events may be provided as probe ingress events (e.g., ProbeIngressEvent 110) and added to a probe events record queue as an event queue entry (e.g., eventQueueEntrie(s) 112a-c). In one embodiment, the probe events record queue may be acted upon by a probe events analyzer, such as ProbeEventsAnalyzer 114. Analyzers, such as ProbeEventsAnalyzer 114, may be heuristic algorithms that determine various known error conditions from recorded events. In one embodiment, ProbeEventsAnalyzer 114 receives an eventQueueEntry as an input, and determines, based on the input, a network issue associated with the event. In one embodiment, as described herein, a network issue may include a type of issue, location of issue, duration of issue, etc.

Various types of analyzers may be utilized by the current embodiment. For example, in one embodiment, a per-probe-stream loss analyzer (not pictured) may be included in system 100. The per-probe-stream loss analyzer may identify a network switch-pair that caused the loss, as well as other type of events and anomalies. In one embodiment, analyzers output per-switch switch alerts (e.g., SwitchAlerts 116) that are received by a reporting mechanism. Alerts (e.g., SwitchAlerts 116) may be logged in a system log (e.g., Syslog/Alerts 120) as alert queue entries (e.g., alertQueueEntries118a-c) and/or streamed from the CRT 106 in real-time to a persistent time series database for further analysis.

Figure 2:
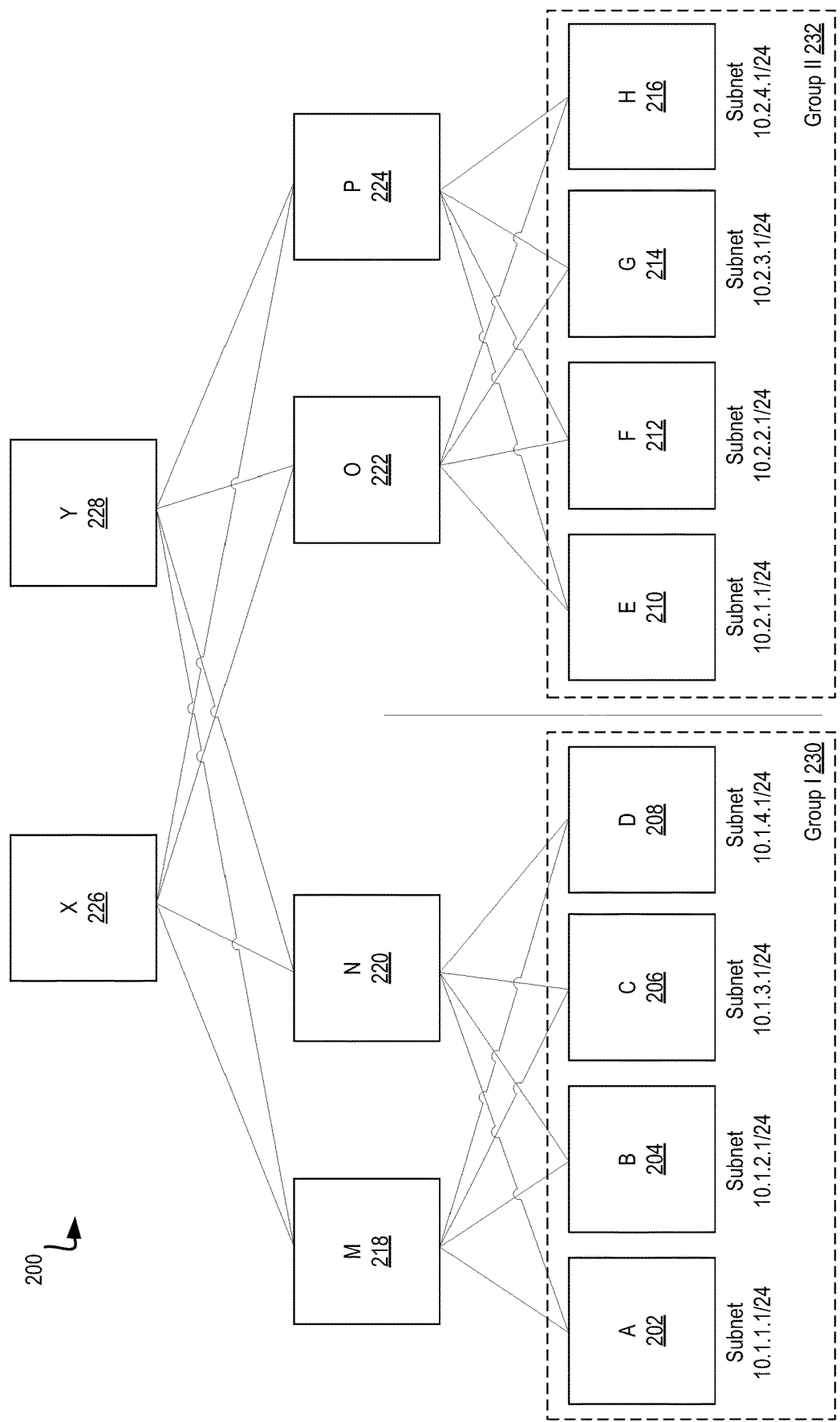
FIG. 2 is a block diagram of a network in which network event detection and analysis may occur in accordance with some embodiments.

FIG. 2 is a block diagram of a network 200 in which network event detection and analysis may occur in accordance with some embodiments. In one embodiment, switches A 202, B 204, C 206 and D 208 are top-of-rack (ToR) switches (e.g., "leaf" switches) in Pod I 230 and similarly E 210, F 212, G 214, and H 216 are ToR switches (e.g., network devices) in Pod II 232. M 128 and N 220 may be spine switches connecting the ToR switches in Pod I 230 and similarly, O 22 and P 224 may be spine switches that connect ToR switches in Pod II 232. X 226 and Y 228 may be top level spine switches that provide inter-pod connectivity between Pod I 230 and Pod II 232.

In one embodiment, configuration for communication between the switches of network 200 may be complicated for even a modest sized network. In one embodiment, every switch in the network is configured with "transmitter probes" for every other switch reachable from it to get full coverage. The following example demonstrates a possible configuration of switch A 202 (other ToR switches may have similar configurations) to monitor other reachable ToR switches:

probe transmitter pod-local
        hops 1 rate 5 probes every 1 minutes uniform
        hops 2 rate 5 probes every 1 minutes uniform
        source interface Loopback100-101
        destination ip 10.1.2.1
        destination ip 10.1.3.1
        destination ip 10.1.4.1
    probe transmitter pod-2
        hops 1 rate 5 probes every 1 minutes uniform
        hops 2 rate 1 probes every 1 minutes uniform
        hops 3 rate 5 probes every 1 minutes uniform
        hops 4 rate 10 probes every 1 minutes uniform
        source interface Loopback100-101
        source port random count 2
        destination ip 10.2.1.1
        destination ip 10.2.2.1
        destination ip 10.2.3.1
        destination ip 10.2.4.1

As the above configuration illustrates, in one embodiment, each switch needs to know about every other switch. Furthermore, the addition or removal of a switch from the network requires reconfiguring every switch. Advantageously, the embodiments described herein overcome the above disadvantages by providing systems and operations to automatically configure communication between switches.

In one embodiment, CRT (e.g., CRT 106 of FIG. 1) may be utilized to centralize the configuration generation, such that manual configuration need not repeat at each switch. To automate the generation of reachability configuration, CRT may receive the source interface(s) on the switch to use for probing and the destination switches to which to send the probes.

In one embodiment, a reachability group (e.g., group I 230 and group II 232) may be a collection of switches and corresponding interfaces that should have similar IP reachability characteristics (e.g., hop distance) between each other. The composition of which switch and interface is part of which reachability group may be specified by labeling the switch interfaces at the switch's CRT configuration. The control server may retrieve the reachability group membership information from each switch to build a global map of switches for a given reachability group. Once a global collection of switches in a reachability group is compiled by the control server, CRT may configure each switch to probe all the other switches.

In one embodiment, for every leaf switch the only configuration utilized on CRT is to define the reachability group the switch's source interface is a part of. In one embodiment, a switch can be part of multiple reachability groups and multiple interfaces on a switch can be part of the same reachability group. For example, each leaf switch in Pod I 230 (A 202, B 204, C 206, D 208) may be configured according to the following non-limiting configuration example:
management cvx
service reachability-monitor
reachability-group pod1_leaf interface Loopback100
reachability-group pod1_pod2 interface Loopback101
Similarly, switches in Pod II 232 (E 210, F 212, G 214, H 216) may have this configuration:
management cvx
service reachability-monitor
no shutdown
reachability-group pod2_leaf interface Loopback100
reachability-group pod1_pod2 interface Loopback101

In one embodiment, on the CRT side, probing configurations between switches within a reachability-group and also between reachability-groups may be specified according to the following:
cvx
service reachability-monitor
no shutdown
probe transmitter intra_pod
probes from pod1_leaf to pod1_leaf
probes from pod2_leaf to pod2_leaf
rate 5 probes every 1 minutes uniform
hop-distance 2
probe transmitter inter_pod
reachability-probes from pod1_leaf to pod2_leaf bidir
rate 2 probes every 1 minutes uniform
hop-distance 4

In one embodiment, the configuration for intra_pod probes may configure intra group probing, e.g., probing in-between switches in Pod I 230 (and also in-between switches in Pod II 232) at the rate of 5 probes sent every minute, spread uniformly. In another embodiment, the configuration for inter_pod probes may configure inter group probing, e.g., in-between switches in Pod I 230 and Pod II 232 and vice-versa (e.g., specified by "bidir").

In one embodiment, hop-distance may specify how many hops away the switches in this group are from each other. As described herein, hop-distance may be utilized to send probes with varying time-to-live (ttl) values (e.g., 1, 2, 3, and so on up to hop-distance) to get smaller ttl probes to expire at intermediate switches and thus be able to detect anomalies at the exact switch at which a probe may get misrouted or dropped. In one embodiment, at the spine switches that are not a part of a reachability group, no special configuration may be utilized. Enabling CRT may enable trapping of probes that expire at the switch. In one embodiment, a range of source ports to use for probes may be configured to utilize equal-cost multi-path (ECMP) routing and Link Aggregation Group multipathing.

In one embodiment, for a given probes configuration, CRT may generate a reachability configuration for all switches that are part of the reachability group in the probes configuration. For example, consider the following CRT configuration:
probe transmitter intra_pod
probes from pod1 leaf to pod1_leaf
rate 5 probes every 1 minutes uniform
hop-distance 2
In one example, pod1_leaf is: {switch_A, switch_B, switch_C, switch_D}. For switch_A, the following reachability configuration may be generated by CRT:
probe transmitter crt_pod1_leaf_to_pod1_leaf
destination ip switch_B
destination ip switch_C
destination ip switch_D
hops 1 rate 5 probes every 1 minutes uniform
hops 2 rate 5 probes every 1 minutes uniform
Similarly, for switch_B, the following reachability configuration may generated:
probe transmitter crt_pod1_leaf_to_pod1_leaf
destination ip switch_A
destination ip switch_C
destination ip switch_D
hops 1 rate 5 probes every 1 minutes uniform
hops 2 rate 5 probes every 1 minutes uniform
Switch_C and switch_D may have similar configurations. Worth mentioning is that CRT may configure the reachability configuration to send multiple probes with varying ttls, starting with a ttl value of 1 and increment all the way to the configured hop-distance. This may be done to trace the path a probe takes through the network.

In one embodiment, Hop-distance specifies how many hops away the switches in this group are from each other. Advantageously, as long as hop-distance is greater than or equal to the maximum hops any given switch is from another in a reachability group, the probe tracing mechanism will function normally.

In one embodiment, packet loss may lead to probe packets being dropped, which may be detected by CRT as probe loss on ingress streams. In one embodiment, if ingress probe loss is detected at a switch for a probe stream that is destined for that switch, CRT may analyze probe losses for similar probes with smaller ttls at switches where those probe streams were recorded previously to narrow down at which switch the loss started occurring. CRT may provide the results of the analysis for further examination and storage.

In one embodiment, if pod1_leaf switches are probing pod2_leaf switches with a hop-distance of 4 hops, the (generated) reachability configuration on switch A 202 may look like this:
probe transmitter crt_pod1_leaf_to_pod2_leaf
source interface Loopback100-101 destination ip 10.2.1.1
destination ip 10.2.2.1
destination ip 10.2.3.1
destination ip 10.2.4.1
hops 1 rate 2 probes every 1 minutes uniform
hops 2 rate 2 probes every 1 minutes uniform
hops 3 rate 2 probes every 1 minutes uniform
hops 4 rate 2 probes every 1 minutes uniform In one embodiment, if there is packet loss between switch X 226 and O 228, probe streams routed from X 226 to O 228 (and vice-versa) may experience a loss. In this example, a subset of probe streams from switches in pod1_leaf may experience a loss at switches in pod2_leaf for probes with ttls 3 and 4, whereas similar probe streams with ttl 1 and 2 may show no loss at intermediate switches M 218, N 220, and X 226. By analyzing ingress records for probe streams experiencing a loss, CRT may determine that the highest ttl streams that are experiencing no loss are recorded at switch X 226. Thus switch X 226 is most likely the culprit switch for loss on probes from pod1_leaf to pod2_leaf switches. CRT may provide such analyses and results for further examination and storage. Streams in the other direction (from pod2_leaf to pod1_leaf) may similarly report switch O 222 as the culprit switch. Combining the two, CRT may determine that a link between X 226 and O 222 may be experiencing packet loss.

In one embodiment, having an excessively large hop-distance configured can mean too many probes generated on the network. In such a case, CRT may automatically determine an optimal hop distance between reachability group members. CRT may determine an optimal hop distance by starting out with a preconfigured high ttl value (e.g., 10), and for each reachable destination, determine what the ttl is at the receiver and switch to that ttl value for future probes.

In one embodiment, configuring every switch in a pod to probe switches in other pods may be expensive for intermediate switches because of the amount of state generated at the switches connecting the pods. In such a case, CRT may dynamically slow down the inter-pod probe-rate and/or probe intelligently between pods by probing a subset of switches between pods. CRT may support various probing coverage modes, wherein not all switches in a reachability group have to probe all other switches in another reachability group. In one embodiment, a default coverage mode may be "full"—i.e. all switches probe all other switches. In addition, CRT may support a "random" probing coverage mode, wherein at every probe interval, a random set of switches is chosen by CRT to probe another random set of switches in the probed group.

In one embodiment, CRT may monitor various anomalies (failures) in real-time. Example of such anomalies include packet loss, ECMP nexthop loss, Link Aggregation Group (LAG) member loss at an egress switch, LAG member loss at an intermediate switch, Maximum Transmission Unit (MTU) mismatch, and route misconfiguration. Each will now be described in detail.

In one embodiment, an ECMP nexthop loss may not necessarily lead to a packet loss. An ingress stream that expired at the nexthop may shift from one switch to another. CRT may recognize an ingress stream shifting from one switch to another and provide an alert about a routing path change.

In one embodiment, reachability egress streams may be sent on exact lag members. A LAG member loss at an egress switch may lead to the egress stream not ingressing anywhere in the network. CRT may recognize such a loss as a complete loss of the egress stream (e.g., it may not ingress anywhere) and provide an alert about the same. LAG member loss at intermediate switch may also be detected and alert provided. In one embodiment, configuration of unequal MTU values on connecting interfaces of two directly-connected network devices can lead to packet drops. In some embodiments, routing protocols and distributed applications set a 'DF' (e.g., "Do not Fragment") control flag in the IP header of the packets they send to avoid IP fragmentation. When MTU of the egress routed interface of one of the intermediate network devices is smaller than the packet size, the device sends an ICMP error ("fragmentation needed") message back to the source. Although in some embodiments it does not make a destination entirely unreachable, it can affect some traffic flows between a given device-pair.

In one embodiment, egress probes may be padded to match the MTU of the egress interface and set the DF flag. MTU mismatches at any of the intermediate switches may be detected and reported to CRT. CRT may recognize mismatches as reachability failures and alert the user with a specific reason for the mismatch.

In one embodiment, routing misconfiguration may cause the packets to be misrouted and they may end up dying somewhere in the network because of ttl expiration. CRT may expect probe packets with the highest ttl to make it to the destination switch. If an ingress stream with the highest ttl (e.g., ttl=hop-distance) is recorded at a switch that is not the destination switch, CRT may determine that the network is most likely misrouting packets. CRT can recognize such an error and provide an alert about the same.

In one embodiment, CRT may be configured to measure and track probe latency by having probes received at a destination switch reflected back to the source. In one embodiment, upon receiving a command, CRT may provide reachability status for display.

Figure 3:
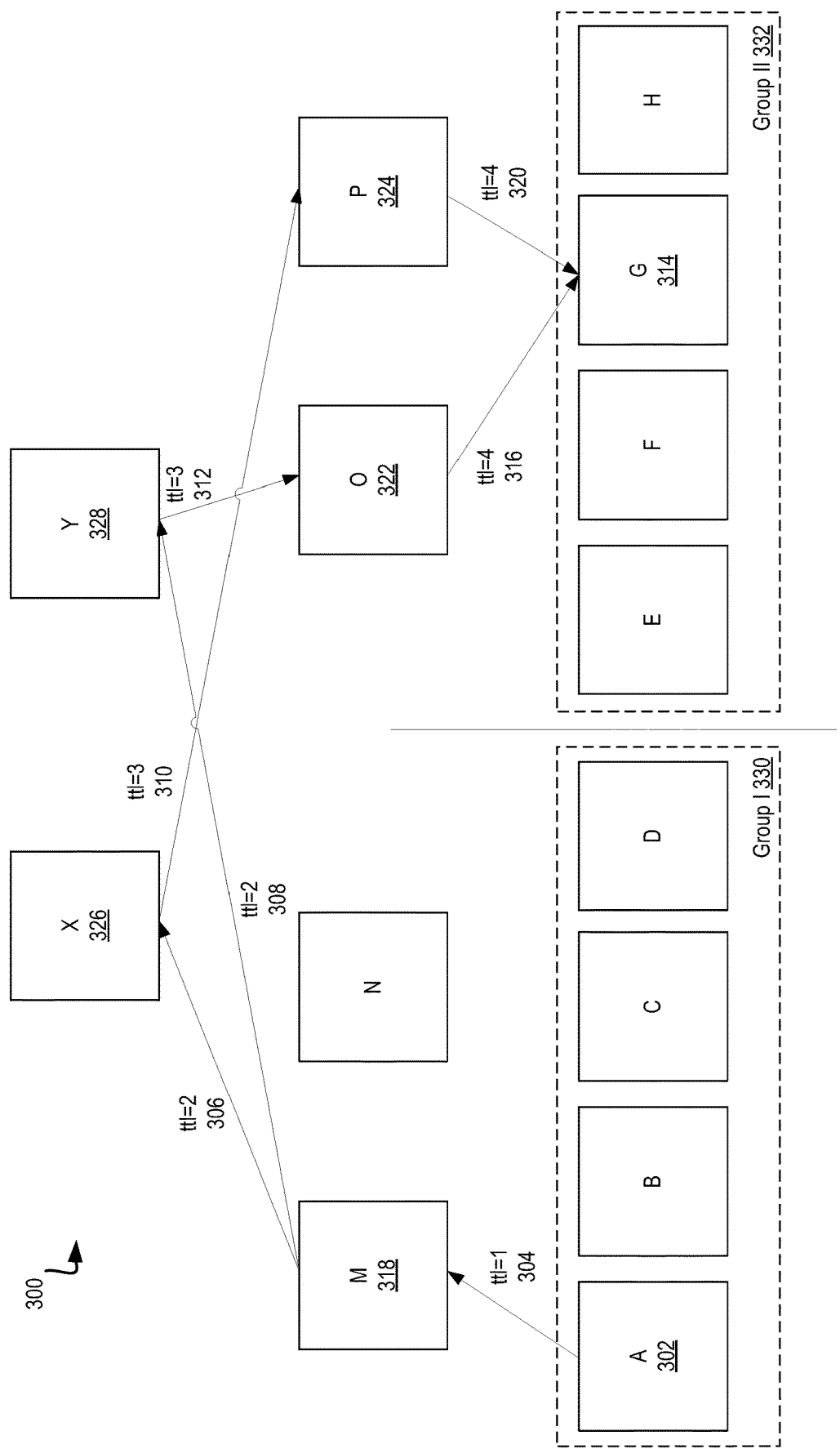
FIG. 3 is a block diagram of network event detection and analysis data flow in a network in accordance with some embodiments.

FIG. 3 is a block diagram of network event detection and analysis data flow in a network in accordance with some embodiments. In one embodiment, CRT builds (compiles) a probe stream record from received probe reports. When ttl for a probe expires, the current network device (e.g., switch may send the probe report to the CRT to be include in the probe stream record. For example, a probe with a ttl value of 1 (e.g., 304) is sent from switch A 302 in group I 320 to switch G 314 in group 332. The probe is captured by switch M 318 when the ttl value expires. In one embodiment, M 318 sends a probe record to CRT to be recorded in the probe stream record. CRT may add the probe record to the probe stream record (e.g., P1, ttl=1: M and P2, ttl=1: M). Similarly, probes are sent to switch G 314 with a ttl value of 2 (e.g., 308, 310) and probe records are sent from switches X 326 and Y 328 to the CRT to be added to the probe stream record (e.g., P1, ttl=2: X and P2, ttl=2: Y). This process may continue with multiple probes having various ttl values (e.g., 312, 316, 320) through switches O 322, P 324, and G 314, each sending probe records to the CRT to be recorded in the probe stream record. In this way, CRT compiles the probe stream record to analyses in real-time. By analyzing the probe stream record in real-time, the CRT may detect network anomalies and report such anomalies to a system or network administrator.

Figure 4A:
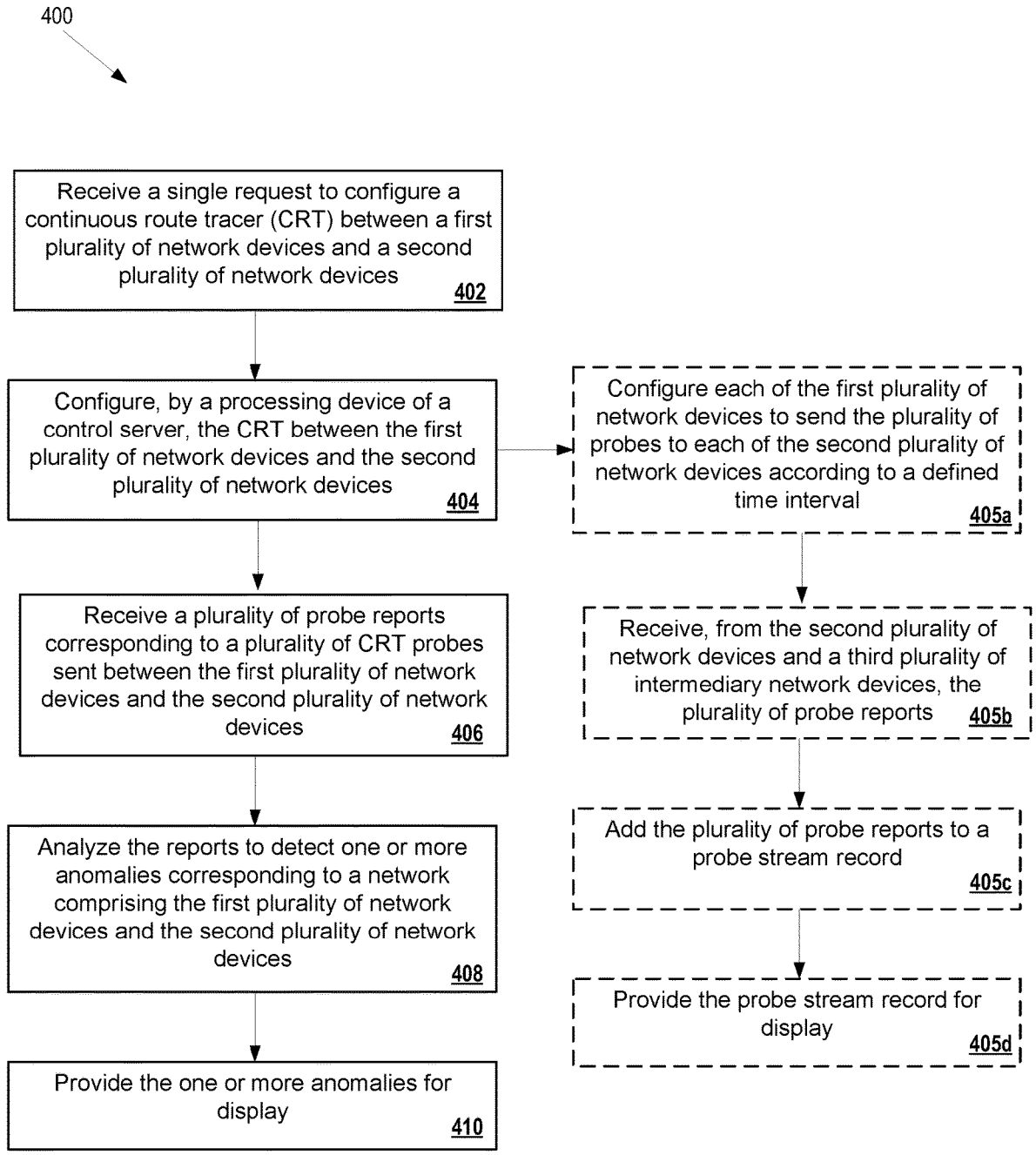
FIG. 4A is a first flow diagram of network event detection and analysis in accordance with some embodiments.

FIG. 4A is a first flow diagram of network event detection and analysis in accordance with some embodiments. The method 400 may be practiced by embodiments of the network device and/or computing device as described herein. Method 400 may be performed by processing logic that may comprise hardware (e.g., circuitry, dedicated logic, programmable logic, a processor, a processing device, etc.), software (such as instructions running on a processing device), firmware, or a combination thereof.

In one embodiment, at block 402, processing logic receives a single request to configure a continuous route tracer (CRT) between a first plurality of network devices and a second plurality of network devices. In one embodiment, the first plurality of network devices and the second plurality of network devices are network switches. At block 404, processing logic configures, by a processing device of a control server, the CRT between the first plurality of network devices and the second plurality of network devices. Optionally, the CRT may be configured according to blocks 405a-d (e.g., configured to skip analyzing network events and to display the aggregate state of each probe stream).

At block 405a, processing logic configures (e.g., each of, in some embodiments) the first plurality of network devices to send the plurality of probes to each of the second plurality of network devices according to a defined time interval. In one embodiment, each of the plurality of probes has a corresponding time-to-live (ttl) value. At block 405b, processing logic receives, from the second plurality of network devices and a third plurality of intermediary network devices, the plurality of probe reports. In one embodiment, each of the plurality of probe reports corresponds to a single probe having an expired ttl value. At block 405c, processing logic adds the plurality of probe reports to a probe stream record and at block 405d, processing logic provides the probe stream record for display.

Continuing to block 406, processing logic receives a plurality of probe reports corresponding to a plurality of CRT probes sent between the first plurality of network devices and the second plurality of network devices. In one embodiment, the probe reports are received in real-time (or substantially real-time), corresponding probes propagate through the network. At block 408, processing logic analyzes the reports to detect one or more anomalies corresponding to a network comprising the first plurality of network devices and the second plurality of network devices. In one embodiment, examples of anomalies may include packet loss, ECMP nexthop loss, LAG member loss at an egress switch, LAG member loss at an intermediate switch, MTU mismatch, and route misconfiguration, as described above. At block 410, processing logic provides the one or more anomalies for display.

Figure 4B:
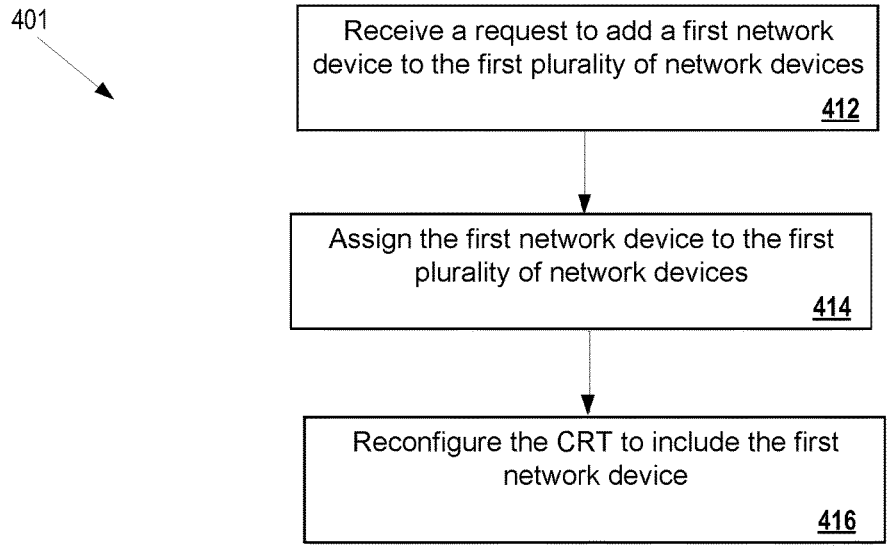
FIG. 4B is a second flow diagram of network event detection and analysis in accordance with some embodiments.

FIG. 4B is a second flow diagram of network event detection and analysis in accordance with some embodiments. The method 401 may be practiced by embodiments of the network device and/or computing device as described herein. Method 400 may be performed by processing logic that may comprise hardware (e.g., circuitry, dedicated logic, programmable logic, a processor, a processing device, etc.), software (such as instructions running on a processing device), firmware, or a combination thereof.

In one embodiment, at block 412, processing logic receives a request to add a first network device to the first plurality of network devices. At block 414, processing logic assigns the first network device to the first plurality of network devices. At block 416, processing logic reconfigures the CRT to include the first network device. It should be repeated that CRT may further configure all switches in the first and second pods to start reaching the newly added network device.

Figure 4C:
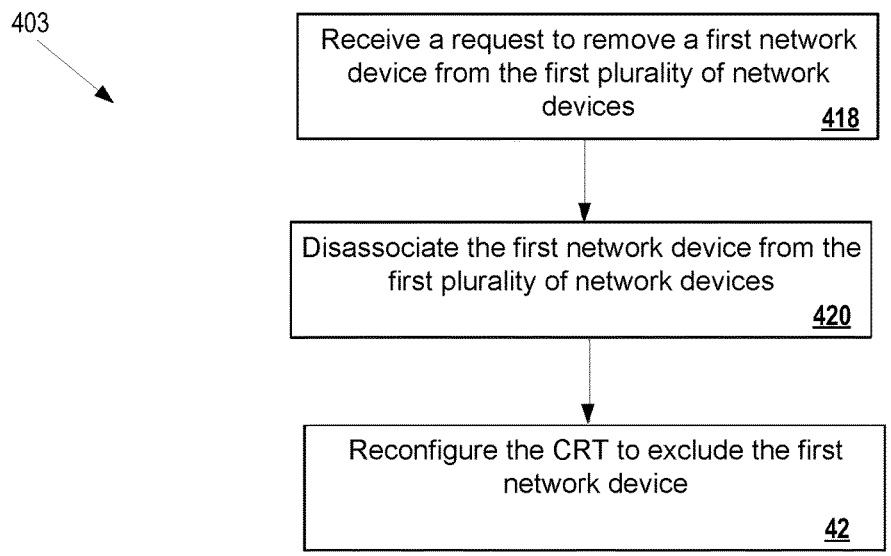
FIG. 4C is a third flow diagram of network event detection and analysis in accordance with some embodiments.

FIG. 4C is a third flow diagram of network event detection and analysis in accordance with some embodiments. The method 403 may be practiced by embodiments of the network device and/or computing device as described herein. Method 400 may be performed by processing logic that may comprise hardware (e.g., circuitry, dedicated logic, programmable logic, a processor, a processing device, etc.), software (such as instructions running on a processing device), firmware, or a combination thereof.

In one embodiment, at block 418, processing logic receives a request to remove a first network device from the first plurality of network devices. At block 420, processing logic disassociates the first network device from the first plurality of network devices. At block 422, processing logic reconfigures the CRT to exclude the first network device.

Figure 5:
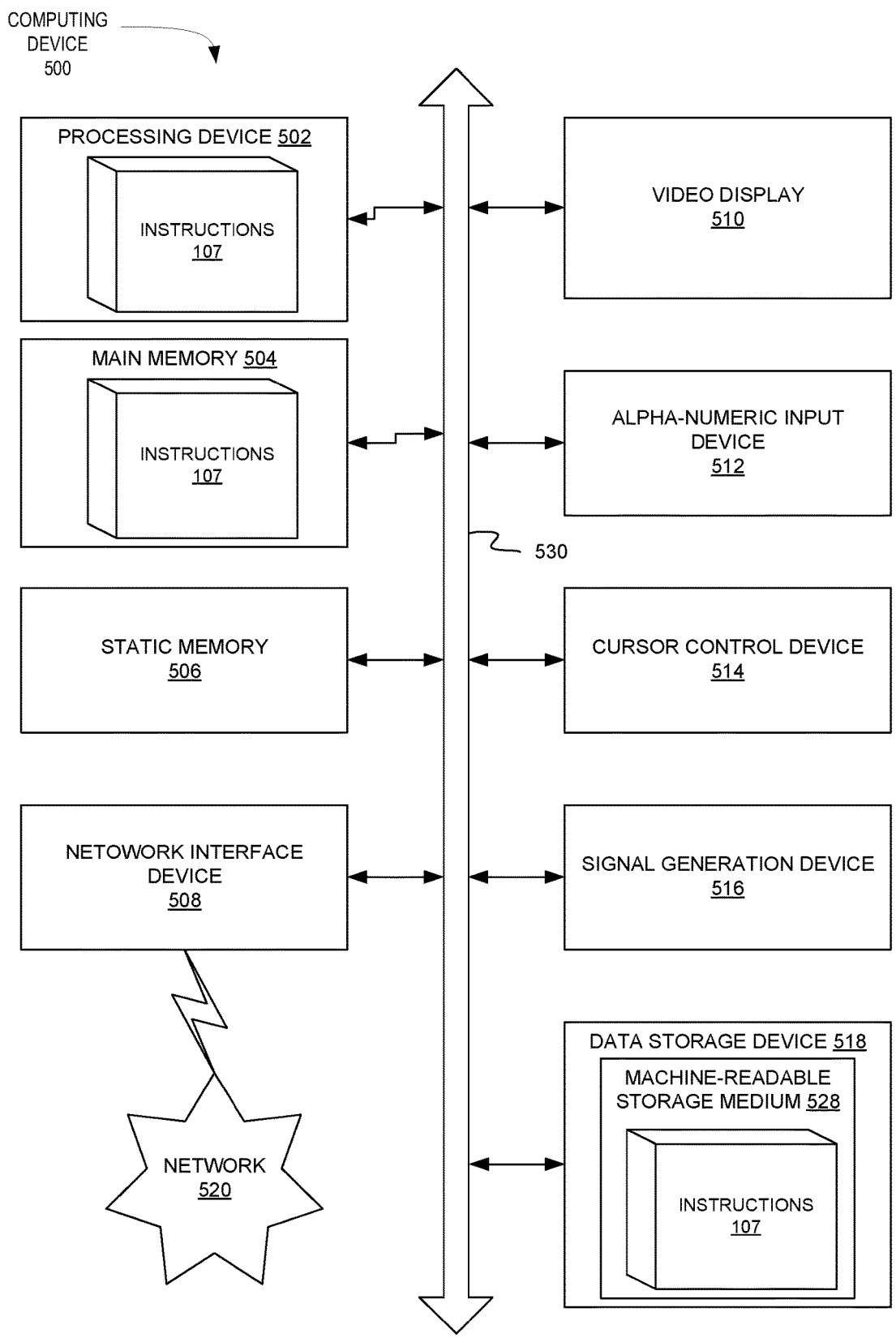
FIG. 5 is a block diagram of an example computing device 500 that may perform one or more of the operations described herein in accordance with some embodiments.

FIG. 5 is a block diagram of an example computing device 500 that may perform one or more of the operations described herein in accordance with some embodiments. In one embodiment, computing device 500 may be a control server (e.g., control server 102 of FIG. 1). Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine (e.g., including a VM) capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the low-latency network device operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the low-latency network device operations described herein, in accordance with one or more aspects of the present disclosure. Instructions implementing module 526 may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "forwarding", "replicating", "buffering", "filtering", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving, at a control server, a single request to configure a continuous route tracer (CRT) between a first plurality of network devices and a second plurality of network devices, the first plurality of network devices being a same hop distance from the second plurality of network devices;
configuring, by the control server, the CRT between the first plurality of network devices and the second plurality of network devices, wherein said configuring the CRT includes:
configuring the first plurality of network devices to send a plurality of CRT probes to the second plurality of network devices, the plurality of CRT probes are configured to cause a plurality of probe reports to be generated at receiving devices when the plurality of CRT probes are received at the receiving devices, and the plurality of CRT probes have different time-to-live (TTL) values up to the same hop distance,
configuring each of the first plurality of network devices to send the plurality of probes to each of the second plurality of network devices according to a defined time interval, wherein each of the plurality of probes has a corresponding TTL value,
receiving, from the second plurality of network devices and a third plurality of intermediary network devices, the plurality of probe reports, each of the plurality of probe reports corresponding to a single probe having an expired TTL value, and
adding the plurality of probe reports to a probe stream record; and
provide the probe stream record for display;
receiving a request from a first network device of the first plurality of network devices to modify the defined time interval;
modifying the defined time interval to generate a modified time interval based on the request from the first network device;
reconfiguring the CRT to include the modified time interval;
receiving, at the control server, the plurality of probe reports corresponding to one or more of the plurality of CRT probes sent between the first plurality of network devices and the second plurality of network devices;
analyzing, at the control server, the received probe reports to detect one or more anomalies corresponding to a network comprising the first plurality of network devices and the second plurality of network devices; and
providing, by the control server, the one or more anomalies for display.

2. The method of claim 1, further comprising:
receiving a request to add a first network device to the first plurality of network devices;
assigning the first network device to the first plurality of network devices; and
reconfiguring the CRT to include the first network device.

3. The method of claim 1, further comprising:
receiving a request to remove a first network device from the first plurality of network devices;
disassociating the first network device from the first plurality of network devices; and
reconfiguring the CRT to exclude the first network device.

4. The method of claim 1, wherein the first plurality of network devices and the second plurality of network devices are network switches.

5. The method of claim 1, wherein the one or more anomalies include at least one of packet loss, equal-cost multi-path (ECMP) nexthop loss, link aggregation group (LAG) member loss at an egress switch, LAG member loss at an intermediate switch, maximum transmission unit (MTU) mismatch, and route misconfiguration.

6. A system, comprising:
a control server comprising a processing device, the processing device of the control server to:
receive a single request to configure a continuous route tracer (CRT) between a first plurality of network devices and a second plurality of network devices, the first plurality of network devices being a same hop distance from the second plurality of network devices;
configure the CRT between the first plurality of network devices and the second plurality of network devices, wherein said configuring the CRT includes:
configuring the first plurality of network devices to send a plurality of CRT probes to the second plurality of network devices, the plurality of CRT probes are configured to cause a plurality of probe reports to be generated at receiving devices when the plurality of CRT probes are received at the receiving devices, and the plurality of CRT probes have different time-to-live (TTL) values up to the same hop distance,
configuring each of the first plurality of network devices to send the plurality of probes to each of the second plurality of network devices according to a defined time interval, wherein each of the plurality of probes has a corresponding TTL value,
receiving, from the second plurality of network devices and a third plurality of intermediary network devices, the plurality of probe reports, each of the plurality of probe reports corresponding to a single probe having an expired TTL value, and
adding the plurality of probe reports to a probe stream record; and
provide the probe stream record for display;
receive a request from a first network device of the first plurality of network devices to modify the defined time interval;
modify the defined time interval to generate a modified time interval based on the request from the first network device;
reconfigure the CRT to include the modified time interval;
receive the plurality of probe reports corresponding to one or more of the plurality of CRT probes sent between the first plurality of network devices and the second plurality of network devices;
analyze the received probe reports to detect one or more anomalies corresponding to a network comprising the first plurality of network devices and the second plurality of network devices; and
provide the one or more anomalies for display.

7. The system of claim 6, the processing device further to:
receive a request to add a first network device to the first plurality of network devices;
assign the first network device to the first plurality of network devices; and
reconfigure the CRT to include the first network device.

8. The system of claim 6, the processing device further to:
receive a request to remove a first network device from the first plurality of network devices;

disassociate the first network device from the first plurality of network devices;

and reconfigure the CRT to exclude the first network device.

9. The system of claim 6, wherein the first plurality of network devices and the second plurality of network devices are network switches.

10. The system of claim 6, wherein the one or more anomalies include at least one of packet loss, equal-cost multi-path (ECMP) nexthop loss, link aggregation group (LAG) member loss at an egress switch, LAG member loss at an intermediate switch, maximum transmission unit (MTU) mismatch, and route misconfiguration.

11. A non-transitory computer-readable storage medium having instructions stored thereon that, when executed by a processing device, cause the processing device to:

receive a single request to configure a continuous route tracer (CRT) between a first plurality of network devices and a second plurality of network devices, the first plurality of network devices being a same hop distance from the second plurality of network devices;

configure, by the processing device, the CRT between the first plurality of network devices and the second plurality of network devices, wherein said configuring the CRT includes:

configuring the first plurality of network devices to send a plurality of CRT probes to the second plurality of network devices, the plurality of CRT probes are configured to cause a plurality of probe reports to be generated at receiving devices when the plurality of CRT probes are received at the receiving devices, and the plurality of CRT probes have different time-to-live (TTL) values up to the same hop distance, configuring each of the first plurality of network devices to send the plurality of probes to each of the second plurality of network devices according to a defined time interval, wherein each of the plurality of probes has a corresponding TTL value, receiving, from the second plurality of network devices and a third plurality of intermediary network devices, the plurality of probe reports, each of the plurality of probe reports corresponding to a single probe having an expired TTL value, and adding the plurality of probe reports to a probe stream record; and provide the probe stream record for display;

receive a request from a first network device of the first plurality of network devices to modify the defined time interval;

modify the defined time interval to generate a modified time interval based on the request from the first network device;

reconfigure the CRT to include the modified time interval;

receive the plurality of probe reports corresponding to one or more of the plurality of CRT probes sent between the first plurality of network devices and the second plurality of network devices;

analyze, by the processing device, the received probe reports to detect one or more anomalies corresponding to a network comprising the first plurality of network devices and the second plurality of network devices; and provide the one or more anomalies for display.

12. The non-transitory computer-readable storage medium of claim 11, the processing device further to:

receive a request to add a first network device to the first plurality of network devices; assign the first network device to the first plurality of network devices; and reconfigure the CRT to include the first network device.

13. The non-transitory computer-readable storage medium of claim 11, the processing device further to:

receive a request to remove a first network device from the first plurality of network devices;

disassociate the first network device from the first plurality of network devices;

and reconfigure the CRT to exclude the first network device.

14. The non-transitory computer-readable storage medium of claim 11, wherein the first plurality of network devices and the second plurality of network devices are network switches.

15. The non-transitory computer-readable storage medium of claim 11, wherein the one or more anomalies include at least one of packet loss, equal-cost multi-path (ECMP) nexthop loss, link aggregation group (LAG) member loss at an egress switch, LAG member loss at an intermediate switch, maximum transmission unit (MTU) mismatch, and route misconfiguration.

* * * * *